(12) United States Patent
Vanapalli et al.

(10) Patent No.: US 10,990,738 B2
(45) Date of Patent: *Apr. 27, 2021

(54) SYSTEM AND METHOD FOR DESIGNING POWER SYSTEMS

(71) Applicant: Texas Instruments Incorporated, Dallas, TX (US)

(72) Inventors: Satyanandakishore Venkata Vanapalli, Campbell, CA (US); Abishek Gupta, Frisco, TX (US); Dien Mac, San Jose, CA (US); Andres Preciado, San Francisco, CA (US); Pavani Jella, Campbell, CA (US); Wanda Carol Garrett, Morgan Hill, CA (US); Marcos Lopez, Wylie, TX (US); Tim Reyes, San Jose, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/439,953

(22) Filed: Jun. 13, 2019

(65) Prior Publication Data

US 2019/0294749 A1    Sep. 26, 2019

Related U.S. Application Data

(63) Continuation of application No. 15/182,767, filed on Jun. 15, 2016, now Pat. No. 10,366,193.

(60) Provisional application No. 62/180,365, filed on Jun. 16, 2015.

(51) Int. Cl.
*G06F 30/39*    (2020.01)
*G06F 119/06*    (2020.01)

(52) U.S. Cl.
CPC .......... *G06F 30/39* (2020.01); *G06F 2119/06* (2020.01)

(58) Field of Classification Search
CPC .......................... G06F 30/39; G06F 2119/06
See application file for complete search history.

(56) References Cited

U.S. PATENT DOCUMENTS

| | | |
|---|---|---|
| 7,958,475 B2 | 6/2011 | Khan |
| 8,332,789 B2 | 12/2012 | Perry et al. |
| 8,712,741 B2 | 4/2014 | Perry et al. |
| 8,972,751 B2 | 3/2015 | Perry et al. |
| 9,087,164 B2 | 7/2015 | Perry et al. |
| 10,366,193 B2* | 7/2019 | Vanapalli ............... G06F 30/39 |
| 2004/0268283 A1 | 12/2004 | Perry et al. |
| 2010/0064146 A1 | 3/2010 | Boles et al. |
| 2010/0207655 A1 | 8/2010 | Jin et al. |
| 2010/0269074 A1 | 10/2010 | Nation et al. |

(Continued)

*Primary Examiner* — Stacy Whitmore
(74) *Attorney, Agent, or Firm* — Ebby Abraham; Charles A. Brill; Frank D. Cimino

(57) ABSTRACT

According to exemplary embodiments, a system and method for automated system power supply design is provided. The system and method enables circuit designers to quickly and independently design complicated single or multi rail power supply systems including multiple loads and sequencing requirements. The power solutions offered to designers may include all required power supplies to power up the loads including sequencers and load switches. The power supply design system may be implemented on a standalone processing unit, a distributed computing network, internet based web application, or among various other network applications.

31 Claims, 13 Drawing Sheets

(56) References Cited

U.S. PATENT DOCUMENTS

2011/4011964     5/2011  Murray
2011/0276938 A1  11/2011 Perry et al.
2011/0320175 A1  12/2011 Perry et al.
2011/0320848 A1  12/2011 Perry et al.

\* cited by examiner

FIG. 7A

| ID | SOLUTIONS | TOTAL EFFICIENCY (%) | 1▲ | TOTAL FOOTPRINT (mm2) | TOTAL BOM COST | TOTAL BOM COUNT |
|---|---|---|---|---|---|---|
| 301 | RAIL - 3.3, 12V | 82.84 | | 374 | $5.99 | 34 |
| 303 | RAIL - 3.3, 7V | 82.37 | | 493 | $5.69 | 40 |
| 302 | RAIL - 3.3V | 80.83 | | 393 | $6.01 | 32 |

FIG. 8A

| ID | SOLUTIONS | TOTAL EFFICIENCY | TOTAL FOOTPRINT | 1 ▲ | TOTAL BOM COST | TOTAL BOM COUNT |
|---|---|---|---|---|---|---|
| 302 | RAIL - 3.3, 3.3 | 38.47 | 486 | | $3.54 | 27 |
| 301 | RAIL - 3.3, 12, | 85.32 | 404 | | $4.31 | 29 |
| 303 | RAIL - 3.3, 7, 3 | 82.12 | 526 | | $4.07 | 35 |

SYSTEM AND METHOD FOR DESIGNING POWER SYSTEMS

CROSS-REFERENCE TO RELATED APPLICATIONS

This application is a continuation of U.S. patent application Ser. No. 15/182,767, filed Jun. 15, 2016, which claims priority to U.S. Provisional Patent Application No. 62/180,365, filed Jun. 16, 2015, the entirety of both are hereby incorporated herein by reference for all purposes.

TECHNICAL FIELD

This disclosure relates generally to the field of circuit design systems and more particularly to single and multi-rail power supply design systems.

BACKGROUND

Generally, complicated electronic systems include components that have multiple input power supply requirements. Some electronic systems include a single power supply and draw various voltage requirements for electronic components from the single power supply. Others may include multiple power supplies depending on the system requirements and design complexity. The power supply design of electronic systems may become complicated by various different design requirements of electronic components.

It is a very difficult task to manually design system power supply when not only technical factors but also business related factors (e.g., cost, footprint, etc.) affect the system design. The manual power system design process can take weeks or even longer to complete, making it difficult to effectively compare multiple solutions in a timely manner.

SUMMARY

In accordance with an embodiment, an apparatus is disclosed. The apparatus includes a user interface, and a processing unit coupled to the user interface. The processor is configured to receive a power system design requirement from the user interface, wherein the power system design requirement include sequencing requirements; and generate a power circuit diagram based at least in part on the power system design requirement using at least one power sequencer.

In accordance with another embodiment, a method is disclosed. The method includes receiving by a processing unit, a power system design requirement from a user interface, and generating a power circuit diagram based at least in part on the power system design requirement using at least one power sequencer.

In accordance with yet another embodiment, a device is disclosed. The device includes a user interface, and a processing unit coupled to the user interface. The processing unit is configured to receive a power system design requirement from the user interface, wherein the power system design requirement includes a power sequencing requirement, and generate a power circuit diagram based at least in part on the power system design requirement, wherein the power circuit diagram includes one or more power sequencers.

BRIEF DESCRIPTION OF THE DRAWINGS

FIGS. 7A-E, illustrate exemplary user input interfaces for power architect unit according to an embodiment.

FIGS. 8A-D illustrate exemplary user input interfaces for power architect unit with the use of load switches according to an embodiment.

DETAILED DESCRIPTION

Figure 1:
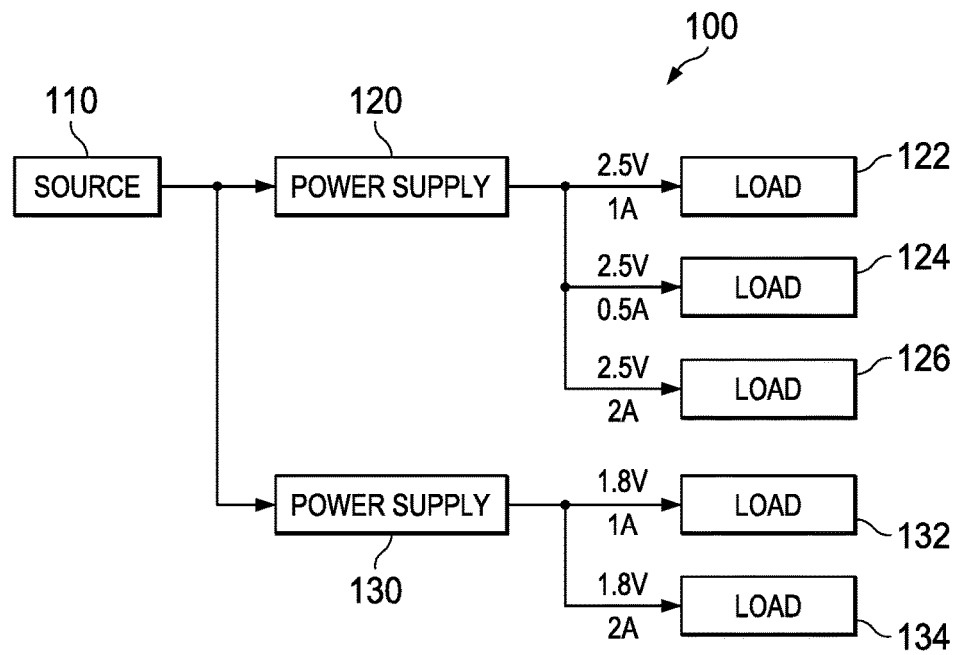
FIG. 1 illustrates an exemplary power system design solution according to an embodiment.

The following description provides many different embodiments, or examples, for implementing different features of the subject matter. These descriptions are merely for illustrative purposes and do not limit the scope of the invention.

Electronic components such as Field Programmable Gate Arrays (FPGA) may require power sequencing. In some common design cases, FPGAs require multiple power supply voltages for core, I/O, and other pins and the order in which these voltages power up and power down can be important for the operation of the electronic system for example, I/O load of FPGAs cannot be powered up before the core is stable. Typically, in system power supply design, loads that require same voltages are coupled to a single power supply. This approach leads to reduced foot print, cost, and in most cases an improved efficiency due to reduced losses. This approach does not work if loads with similar voltage requirement also have a power sequencing requirement due to certain design requirements. They cannot be powered up at the same time and thus must be sequenced. The system power supply design challenges become more complicated with sequencing especially, when some of the components that are connected to the rail voltages need to be powered before some of their downstream power supplies. These design challenges become further complicated when factors such as footprint requirement, costs, load types, power loss efficiency, device ratings, and others start affecting the design decisions.

According to exemplary embodiments, a system and method for automated system power supply design tool is provided. The system power supply design tool enables system designers to quickly and independently design complicated single or multi rail power supply systems with multiple loads and sequencing requirements. The tool provides an interface to system designers to prompt for a set of selection criteria such as supply voltage, sequencing, load requirement (current and voltage), device rating, power efficiency, footprint, cost, and others. An intelligent power solution builder puts together several power trees structures based on the optimization setting, pre-defined power tree map and sequencing requirements. It then searches through a large collection of power supply database to populate the power tree with appropriate power supply designs based on the selection criteria. Designers may select from among multiple power solutions that are presented to them with complete information that includes bill of material (BOM) cost, BOM count, footprint, System Efficiency, and other related information.

Circuit designer may also have options to specify loads with termination requirements, sequencing, and whether to use load switches in the design. The power solutions offered to designers may include all required power supplies to power up the loads including a sequencer to enable the power supplies. Load switches play an important role in reducing the system cost and improving system efficiency and may be included in the power solution offered by the power supply design system.

The power supply design system may be implemented on a standalone processing unit, a system circuitry, a distributed computing network, internet based web application, or among various other network applications. All interface design computations may be done in background and a user may provide inputs regarding power supply requirements. The system may also provide comparison analysis among different power supply design solutions and allow users to choose the optimal solution for their application. This approach provides a power supply design solution in significantly shorter time (e.g., in minutes) versus conventional design tools that may take weeks to finalize a given power supply system for a device.

Referring to FIG. 1, an exemplary power system design solution 100 that may be provided by the power system design solution tool is illustrated according to an embodiment. The design solution 100 includes a power source 110 that provides the basic power to the system. The source 110 may be any power supply source, internal or external, that supplies the required power to operate various loads in the system. The design solution 100 includes five loads 122, 124, 126, 132, and 134. The loads 122, 124 and 126 require 2.5V as input power and loads 132 and 134 require 1.8V as input power. The power supplied by the source 110 is used to provide required input power to individual loads using separate power supplies. Power supply 120 converts power from the source 110 and provides 2.5V to loads 122, 124, and 126 and the power supply 130 converts power from the source 110 and provides 1.8V to loads 132 and 134.

Figure 2:
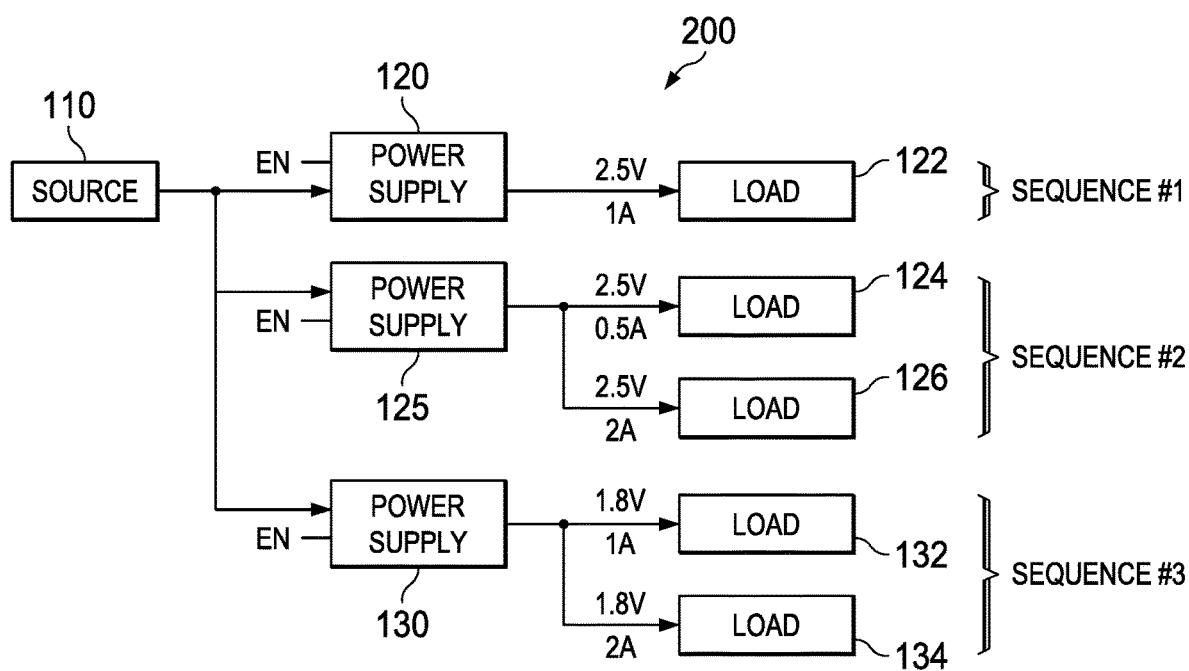
FIG. 2 illustrates an exemplary power system design solution with sequencing requirement according to an embodiment.

Referring to FIG. 2, an exemplary power system design solution 200 with sequencing requirement that may be provided by the power system design solution tool is illustrated according to an embodiment. The design solution 200 is similar to the design solution 100 except that in design solution 200, load 122 need to be powered up before loads 124 and 126 and loads 132 and 134 need to be powered up after the loads 124 and 126 have been powered up. This is referred to as power sequencing. Each power supply is enabled via an enable pin 'en' according to the system power sequence requirement. The power supplies may be enabled via any programming unit such as for example a system controller that controls the power supply or a dedicated power supply controller that may be programmed to enable power supplies as required by a given powering sequence. Thus in the power sequence #1, load 122 is powered up, in power sequence #2, loads 124 and 126 power up, and in power sequence #3, loads 132 and 134 power up. Even though loads 122 and 126 require the same input power as load 122, they cannot be connected to the same power supply 120 as load 122 because otherwise loads 124 and 126 will be powered up at the same time as the load 122. Thus, an additional power supply 125 is provided for loads 124 and 126 with same input power supply to address the power sequencing requirement of the system.

Figure 3:
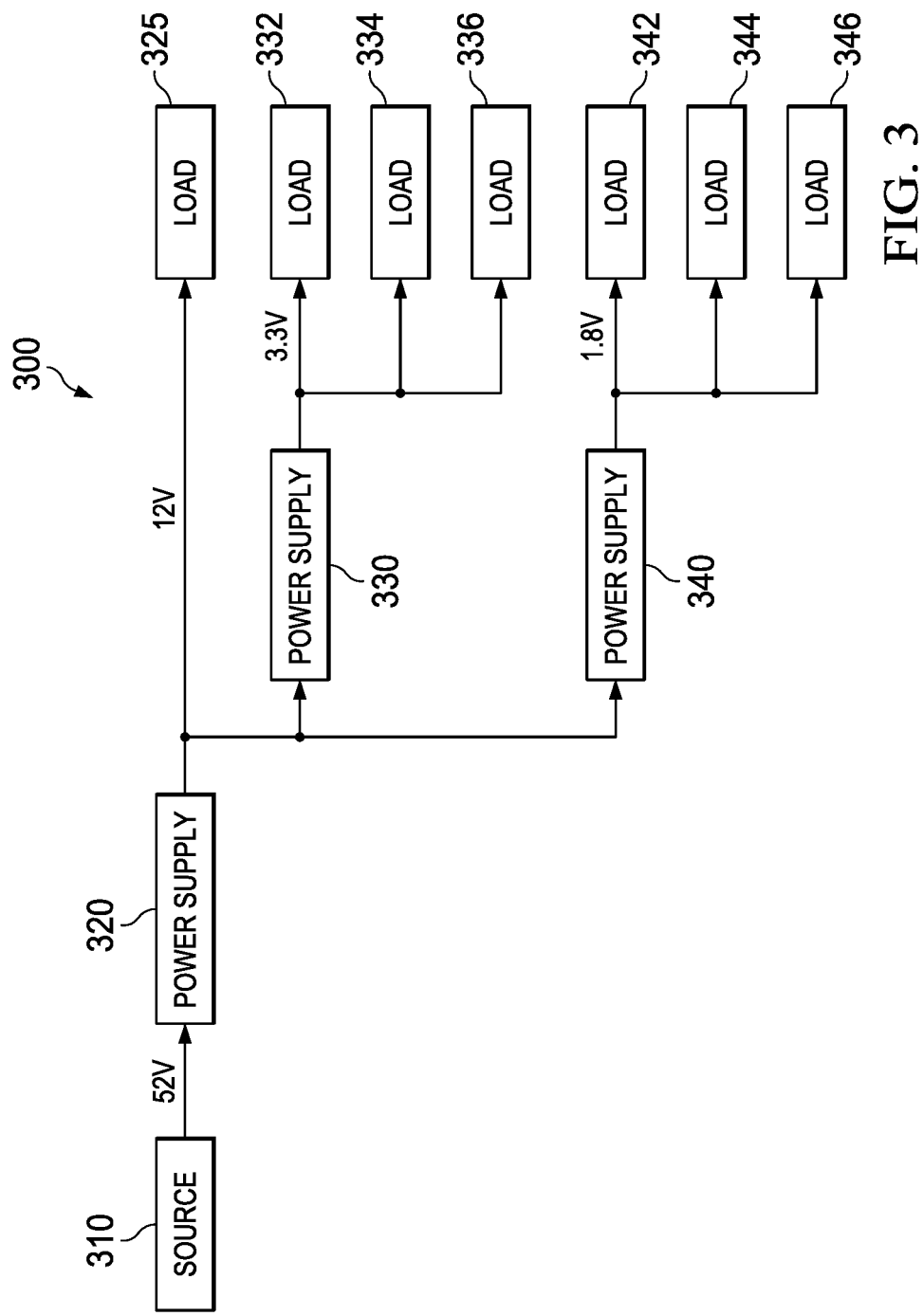
FIG. 3 illustrates an exemplary power system design solution with rail voltage requirement according to an embodiment.

Referring to FIG. 3, an exemplary power system design solution 300 with rail voltage as one of the load requirement is illustrated that may be provided by the power system design solution tool according to an embodiment. The power supply 320 converts the basic power source to 12V as required by the load 325. Loads 332, 334, and 336 require 3.3V thus the power supply 330 converts 12V supply from the power supply 320 to 3.3V. Similarly, to support loads 342, 344, and 346, power supply 340 converts the 12V supply from the power supply 320 into 1.8V. As illustrated, the power source is a 52V supply. If there is no sequencing requirement, then a rail voltage of 12V may power up the load 325 and also power the points of load supplies 3.3V for loads 332, 334, and 336 1.8V for loads 342, 344, and 346. The illustrated solution 300 may not work if the system also has a power sequencing requirement that requires the loads 3.3V, 1.8V, and 12V to be powered up in that order respectively.

Figure 4:
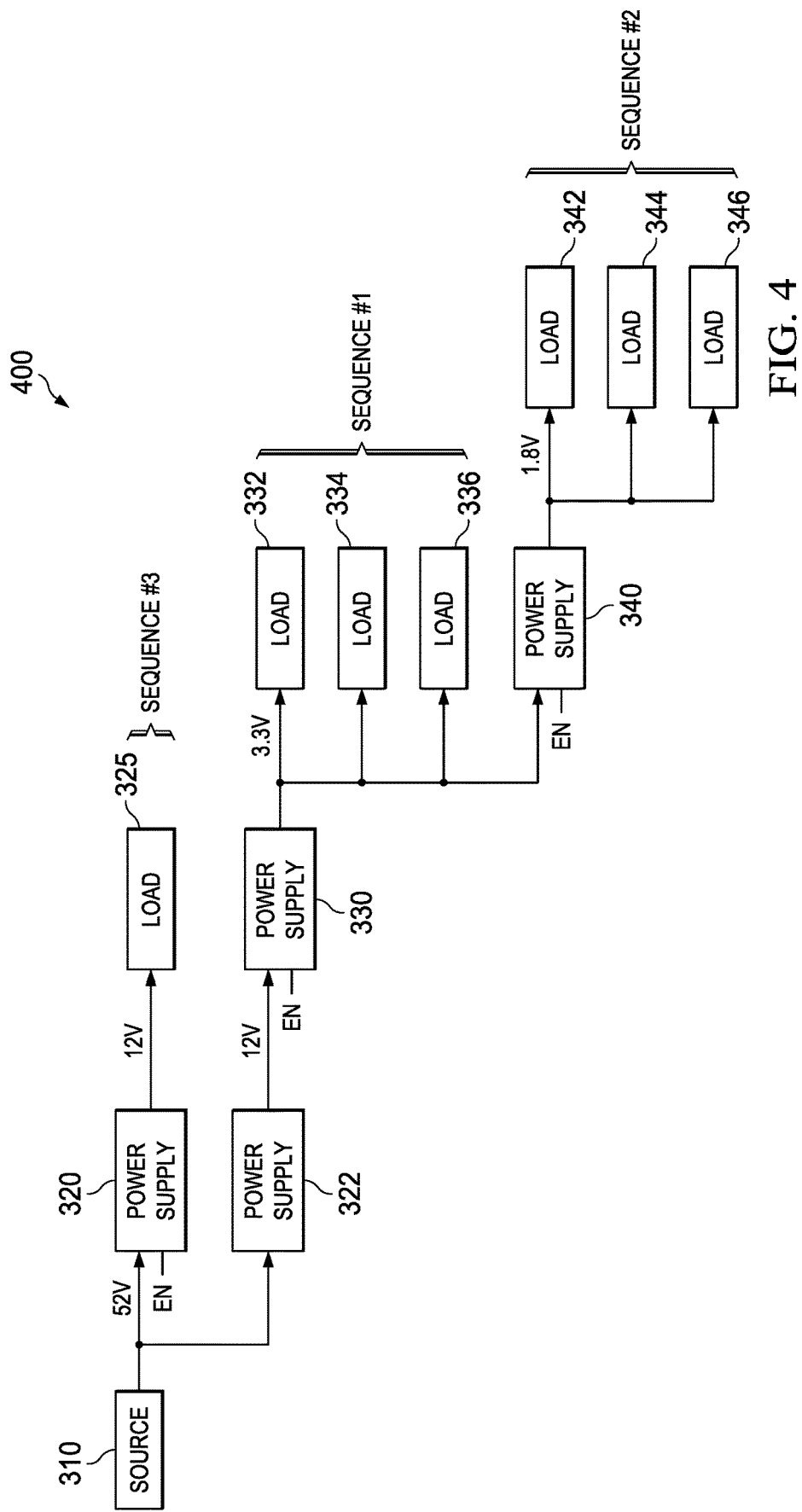
FIG. 4 illustrates an exemplary power system design solution including rail voltage with sequencing requirement according to an embodiment.

Referring to FIG. 4, an exemplary power system design solution 400 including rail voltage with sequencing requirement that may be provided by the power system design solution tool is illustrated according to an embodiment. The power solution 400 is similar to the power solution 300 illustrated in FIG. 3 except that in solution 400, loads have a predefined sequencing requirement. Loads 332, 334, and 336 require power up prior to loads 342, 344, and 346 and the load 325 require power up after loads 342, 344, and 346. To accommodate power sequencing requirement, additional power source 322 is added to provide 12V for power sequences #1&2. Each power supply is enabled according to the power sequence requirement. In solution 400, the power supply of the 12V load is split into two individual 12V supplies 320 and 322. This enables sequencing of loads appropriately.

While for exemplary purposes, specific design solutions are shown, however, one skilled in the art will appreciate that any combination of power supplies may be used to provide sequencing and power to the loads. For example, in the illustrated solution power supply 340 draws power from power supply 330 in a hierarchical way; however, the power supply 340 may draw power from the power supply 322 or the source 310 directly. Similarly, while loads associated with a given power supply are combined in one power-up sequence; however, each load may have its own power up sequence requirement thus further splitting power supply sources. Typically, in hierarchical structure, loads in the downstream power supply have a higher sequence order than the loads in the upstream power supply; however, any power up sequence may be designed using the power supply design system according to various embodiments.

As the requirement of power for a given system design gets complex, the power design solution becomes even more complex and requires careful component design layout considering all other factors (e.g., footprint, cost, efficiency, etc.) as explained hereinabove. It is not cost effective to have separate power supply for each load when each load has a different sequencing requirement. One common solution to balance sequencing requirement and overall system cost and footprint is to use load switches to accommodate different sequencing requirements for loads with similar input voltage requirement.

Figure 5:
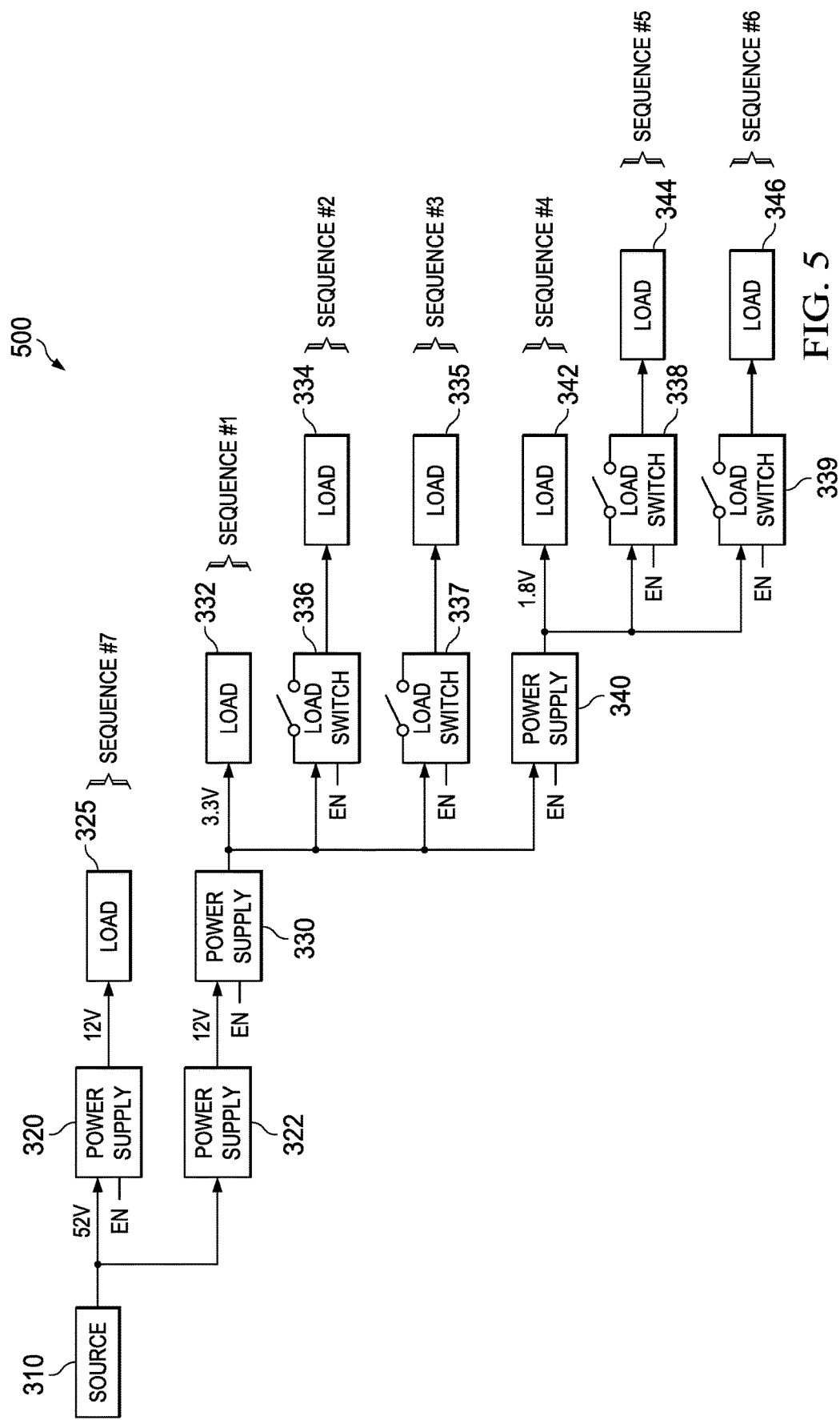
FIG. 5 illustrates an exemplary power system design solution including rail voltage with sequencing requirement using load switches according to an embodiment.

Referring to FIG. 5, an exemplary power system design solution 500 including rail voltage with sequencing requirement using load switches that may be provided by the power system design solution tool is illustrated according to an embodiment. Power solution 500 is similar to the power solution 400 except that in power solution 500, the sequencing order for each load with the same voltage requirement is different. In the exemplary illustration, load 332 is the first one to power up. The power supply 330 will be enabled first to provide the 3.3V input voltage to the load 332; however, the power supply 330 also provides input voltages to loads 334 and 335 for example via Load Switches 336 and 337 respectively, which provides sequencing for the loads as described herein below. Load 334 is second in the power sequence and load 335 is third in the power sequence for 3.3V and do not need to be powered up with the load 332.

To avoid providing individual power supplies for loads 334 and 335, which may increase the design footprint and costs, load switches 336 and 337 are introduced to facilitate power sequencing. At the power up of Power Supply 330, load switches 336 and 337 may be in open state thus allowing the power up of load 332 without powering up loads 334 and 335. When loads 334 and 335 need to be powered up, load switches 336 and 337 may be enabled appropriately by a sequencer to provide power to loads 334 and 335 accordingly thereby enabling a sequence of powering loads. Similarly, the power supply 340 will be enabled at the appropriate time with the help of a sequencer to provide the 1.8V input voltage to the load 342 while load switches 338 and 339 facilitate the power sequencing for loads 344 and 346. Load 325 may be powered up at its power sequence by enabling the power supply 320 accordingly.

As illustrated in FIGS. 1-5, when power system design get complicated, more resources are needed to balance the power requirement for each component in the system. Designing the power manually with balancing of power sequencing, rail voltages, footprint, cost, power efficiency, type of load termination, and others becomes increasingly difficult and may result in significant loss of time and resources. Some load terminations may be predefined such as for example, Double Data Rate (DDR) memory load termination may be predetermined. Other load termination requirements may be determined based on each individual system design requirement.

Figure 6:
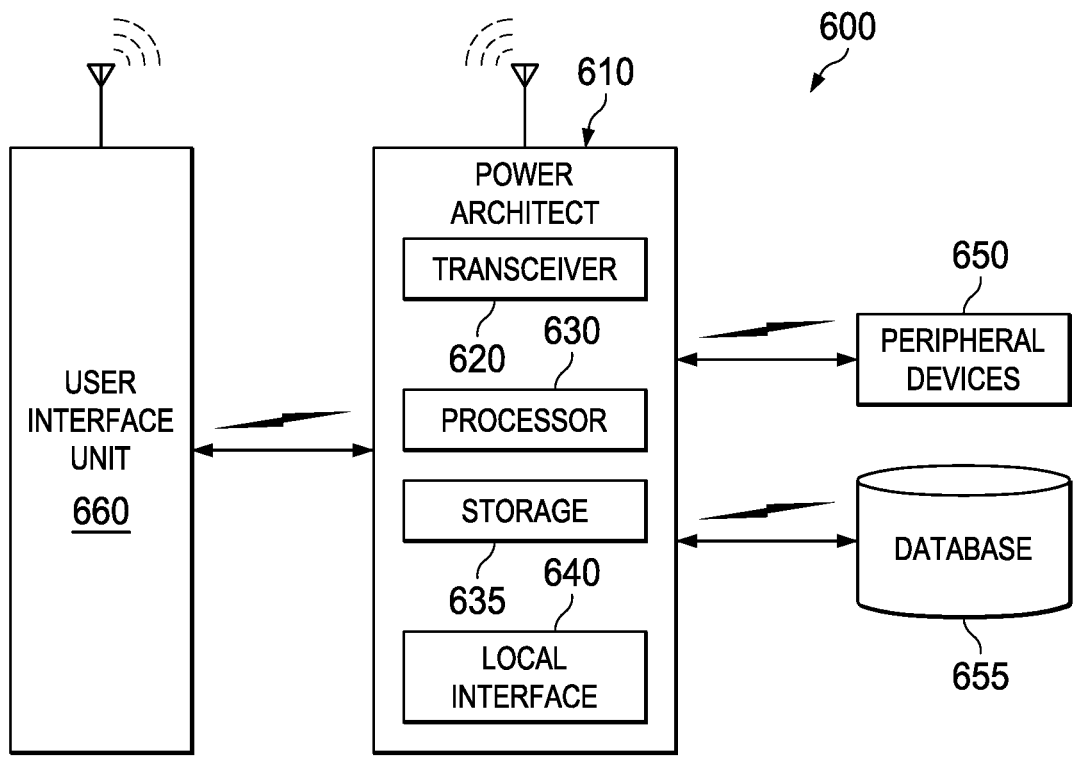
FIG. 6 illustrates an exemplary power solution design system according to an embodiment.

Referring to FIG. 6, an exemplary system 600 for a power solution design system is illustrated according to an embodiment. System 600 includes power architect unit 610. The power architect unit 610 may be any computing device, processing unit, circuitry, integrated circuit and the like configured to provide power design solutions based on a user's requirements according to various embodiments described herein. The power architect unit 610 may be a standalone system or distributed over various network components in a network of devices. Further, power architect unit 610 may be integrated into a user interface device as a user application. In additional examples, power architect unit 610 may implement a web server and be communicatively coupled to user interface unit 660 via the interne and/or World Wide Web.

The power architect unit 610 may include processor 630, storage 635, local interface 640, and transceiver 620 and many others. The power architect unit 610 and/or the sub units thereof may be implemented on one or more integrated circuits. While single sub units are shown for explanation purposes; however, the power architect unit 610 is not limited to sub units as illustrated for example, it may include multiple processors, transceivers, storage devices, special purpose computing units, and various other user interfaces for user interactions. The power architect unit 610 may communicate with and access a database unit 655. The database 655 is shown as independent unit for explanation purposes only; however, the database unit 655 may be an integral unit of the power architect unit 610 or it may be a web or cloud based database configured to provide data as needed to the power architect unit 610. The power architect unit 610 may also communicate with various peripheral devices 650 such as monitors, printers, scanners, special purpose design tools, other computers, and various other devices as needed. The peripheral devices 650 may communicate with the power architect unit 610 via wireline or wireless mediums.

The system 600 further includes a user interface unit 660. The user interface unit 660 may be any computing device based user interface such as a computer aided designing system, a general purpose computer, a mobile device, or any other device that may interface and communicate with the power architect unit 610 via wireline or wireless interface through transceivers (not shown). The user interface unit 660 may have various applications executing that may provide web based access through any web server or direct access to the power architect unit 610. The user interface unit 660 may be configured to provide input for various power system design requirements as explained herein. The user interface unit 660 may also include various components for communicating with the power architect unit 610 such as for example a keyboard, a web-based interface, a circuit design tool interface, an electronic file transfer interface, and many others like that.

A user may provide power system design requirements by providing input to the power architect 610 such as for example, load termination, sequencing, footprint, total cost, load voltage and current, power efficiency, sequencing, load switching, and other various parameters needed for selecting an optimal power solution. Based on the user's input and requirements, the power architect 610 may propose a power solution that may fit the user's needs and propose various options using different components. The power architect may search the database 655 via integrated links or may search a web or cloud based distributed databases of various components that may fit with the user's requirements. The Power architect 610 may also provide alternate components with different ratings as options to the user.

Figure 7E:
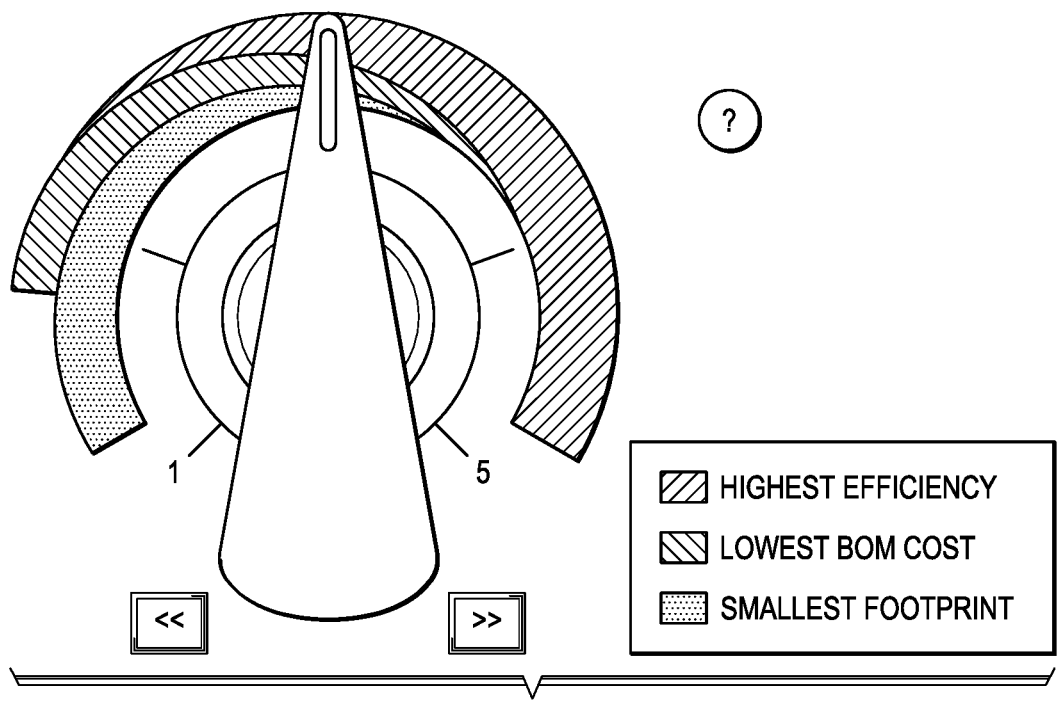
Figure 7A:
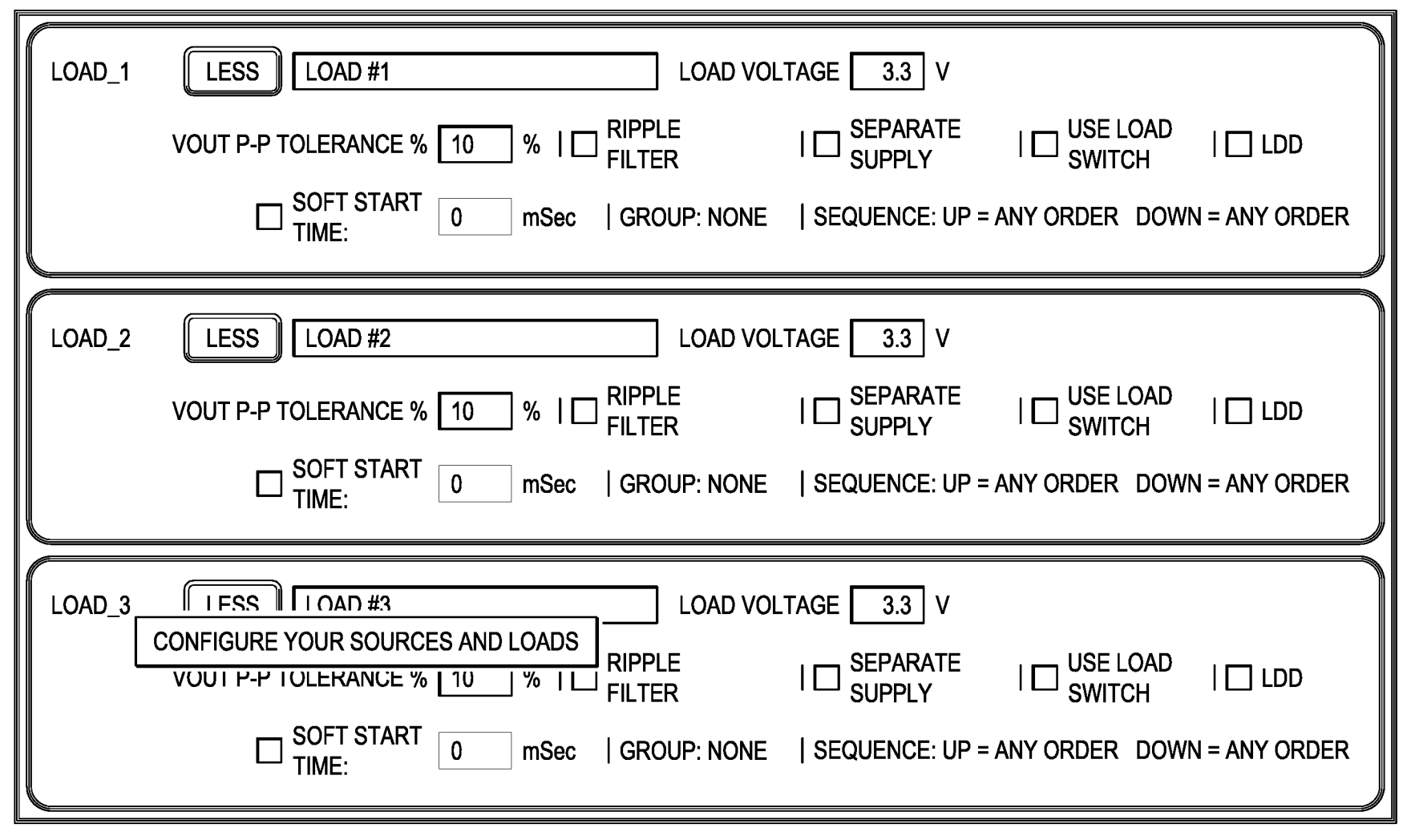
Figure 7B:
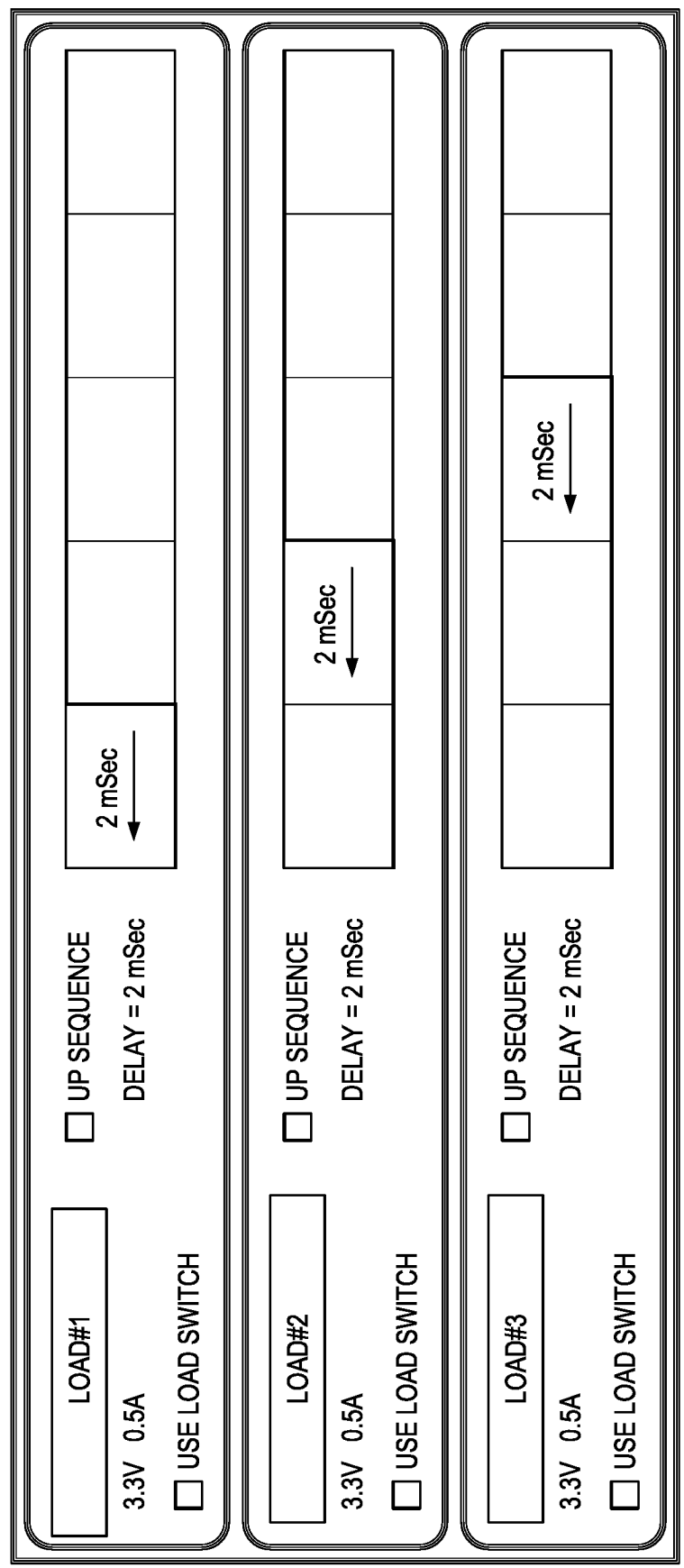
Figures 7C, 7D:
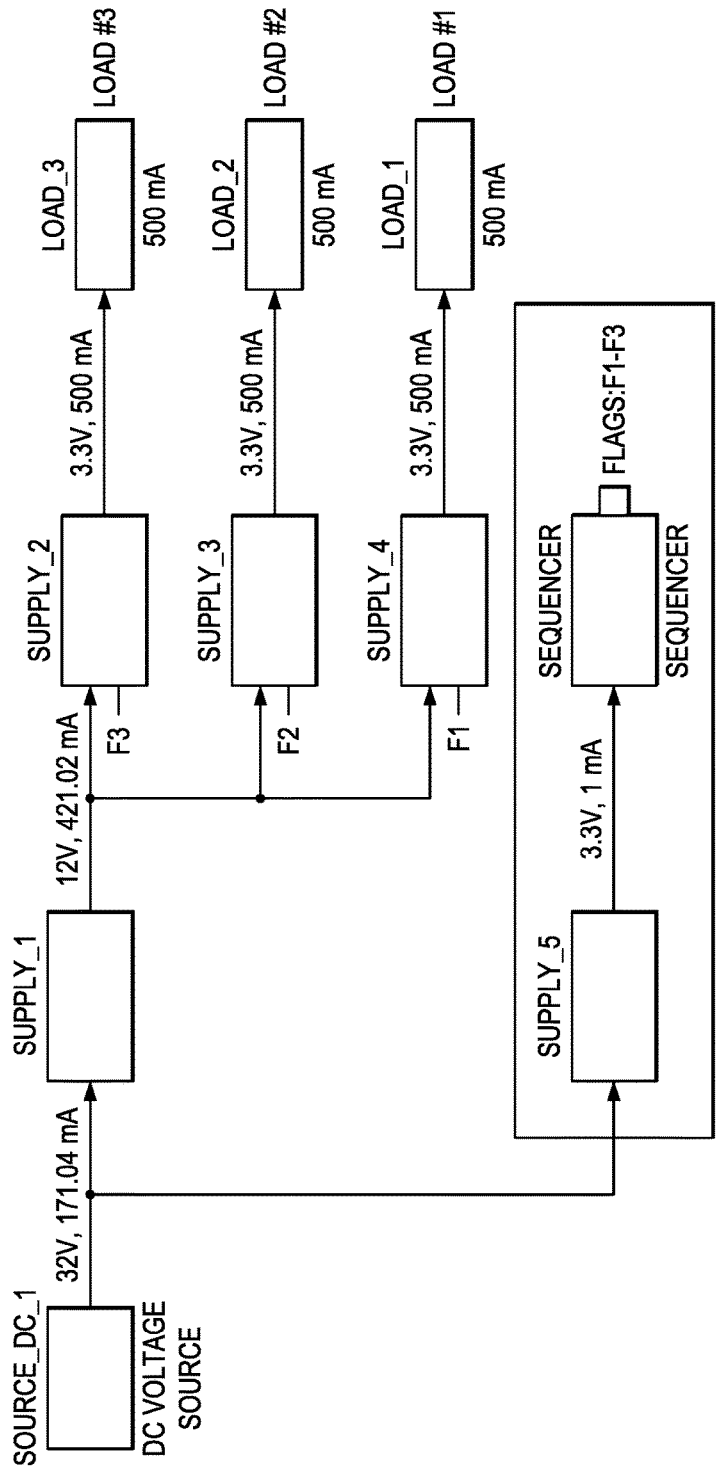

Referring to FIGS. 7A-E, exemplary user input interface displays for power architect unit 610 are illustrated according to an embodiment. FIG. 7A illustrates user input display for load requirement. A user may input values for each individual load. As illustrated as an example, a user may input load requirement of 3.3V with 10% tolerance. The user may also select sequencing and load switching requirements; however, for simplification purposes, FIG. 7A illustrates basic power supply design requirements. When a user selects power sequencing requirements, then the user may input sequencing requirements as illustrated in FIG. 7B. The user may adjust the sequencing timing by adjusting the 'on' timing for each load. In the illustrated example, each load is selected to be delayed by 2 mSec from the previous load. After the user inputs requirement data into the power architect unit for example, unit 610 as illustrated in FIG. 6, the power architect unit may provide a proposed solution as illustrated in FIG. 7C. The proposed solution may include block diagram for various components or may also include specific component part numbers as required by the user. After reviewing the proposed solution, the user may decide to change the requirements or may proceed with the analysis of the proposed solution.

When the user proceeds with the analysis of the proposed solution, then the power architect unit may provide further analysis of the proposed solution as illustrated in FIG. 7D. The illustrated analysis may include information about the power solution itself, total efficiency of the proposed solution, the amount of footprint that may be used based on the proposed component parts, bill of material cost, total count of the bill of material, and others. The user may select various option for designing a solution using user interfaces such as for example a variable data selection knob illustrated in FIG. 7E. After inputting the initial requirements, the user may indicate the overall goal of the system solution in terms of Cost, Efficiency, and Foot Print by adjusting the knob to the appropriate setting. For example, if the user desires to build a high efficiency system, then the user may indicate the choice by setting the Knob to "Highest Efficiency" or if the user desires to build a low cost system then the user may indicate the choice by setting the knob to "Lowest BOM Cost" and the like. While for exemplary purposes, only illustrated data and data input method is provided, however, the power architect may also provide various forms of methods to input and then modify requirement data such as data input screens illustrated in FIG. 7A or the like. The further analysis of the proposed solution may also be provided such as for example, overall bill of material analysis for the entire design solution, power solution footprint analysis in view of the entire design solution analysis, and the like.

Figure 8A:
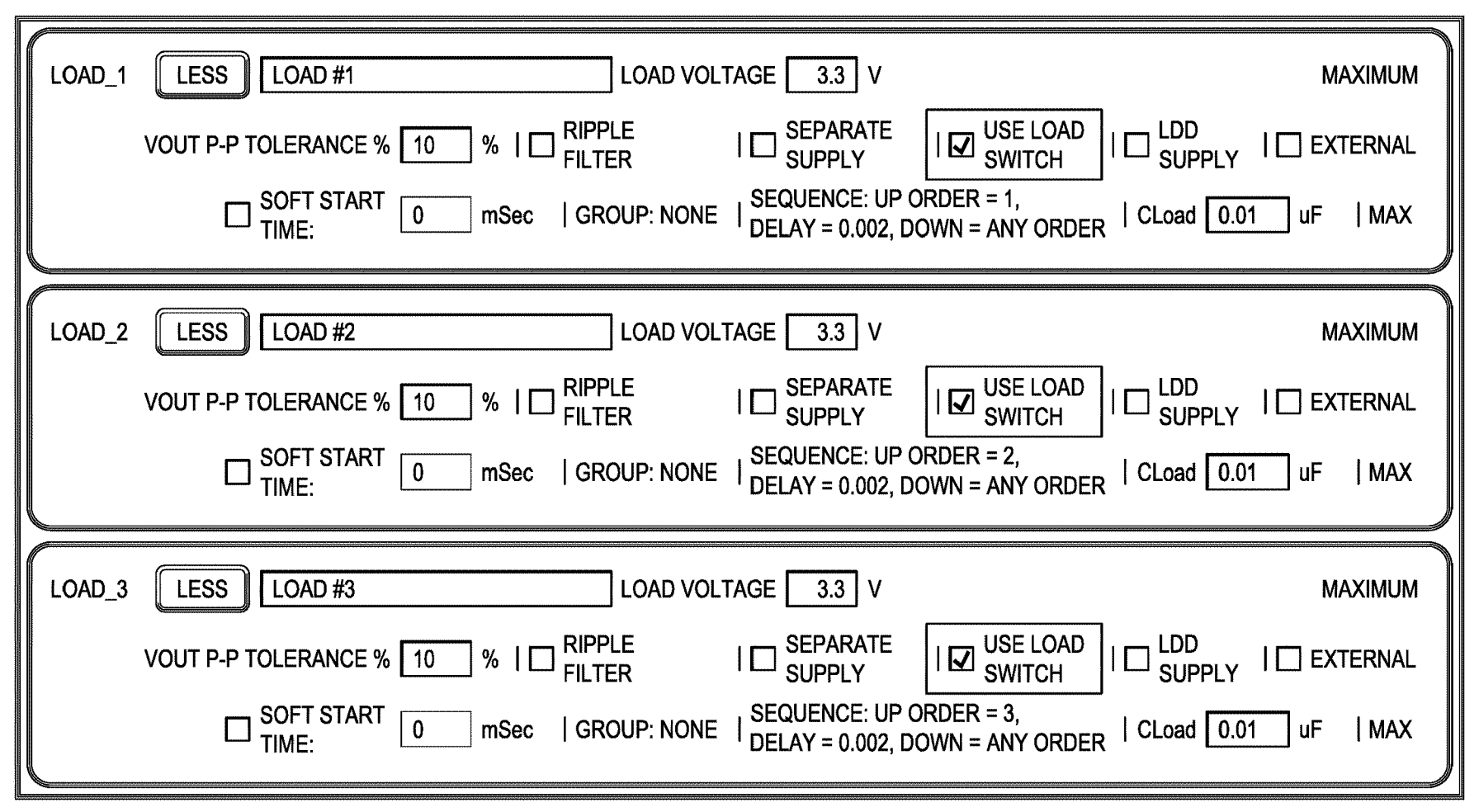
Figure 8B:
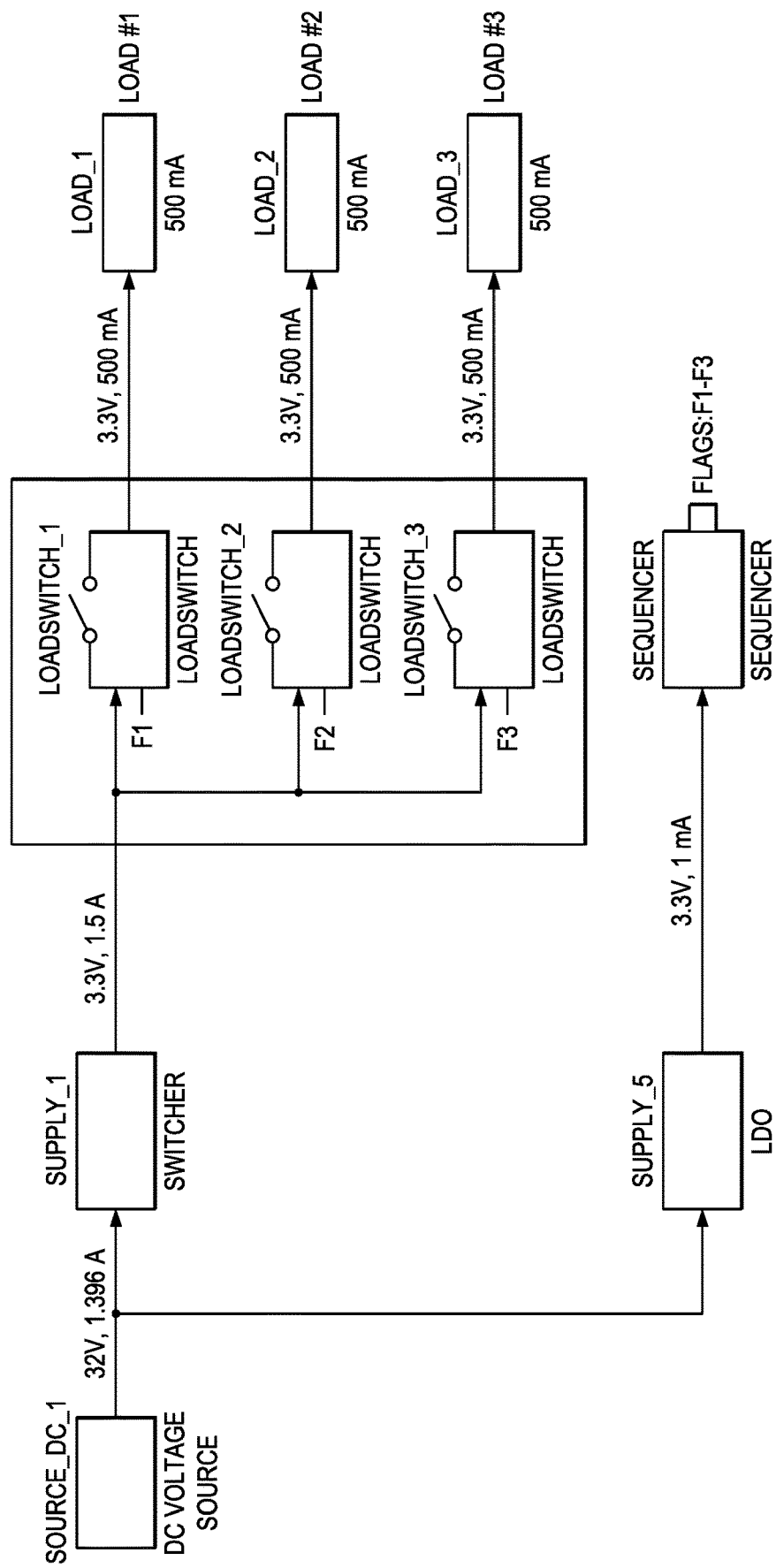

Referring to FIGS. 8A-D, exemplary user input displays for power architect unit with the use of load switches are illustrated according to an embodiment. FIG. 8A illustrates user input for load requirement with option for the use of load switches selected by the user. After the user inputs requirement data with load switches option selected, the power architect unit may provide a proposed solution as illustrated in FIG. 8B. The proposed solution may include block diagram for various components or may also include specific component part numbers as required by the user. The proposed solution as illustrated includes various load switches.

Figures 8C, 8D:
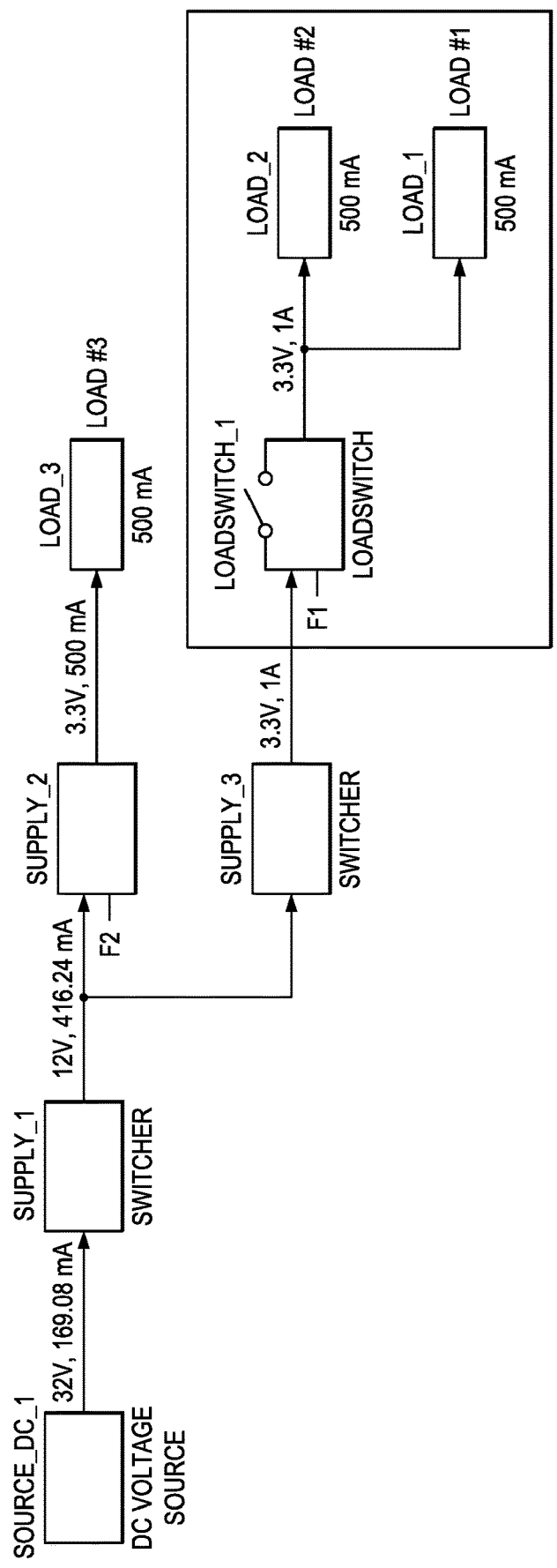

After reviewing the proposed solution, the user may decide to change the requirements or may proceed with the analysis of the proposed solution or may further optimize the proposed solution as stated hereinabove. FIG. 8C illustrates an alternate solution, which combines various load switches. A user may use various options to further optimize the proposed solution based on each individual user's component power requirement. The power architect may further provide proposed solution analysis based on the use of load switches as illustrated in FIG. 8D. The illustrated analysis may include information about the solution itself, total efficiency of the proposed solution, the amount of footprint that may be used based on the proposed component parts, bill of material cost, total count of the bill of material, and others.

Figure 9:
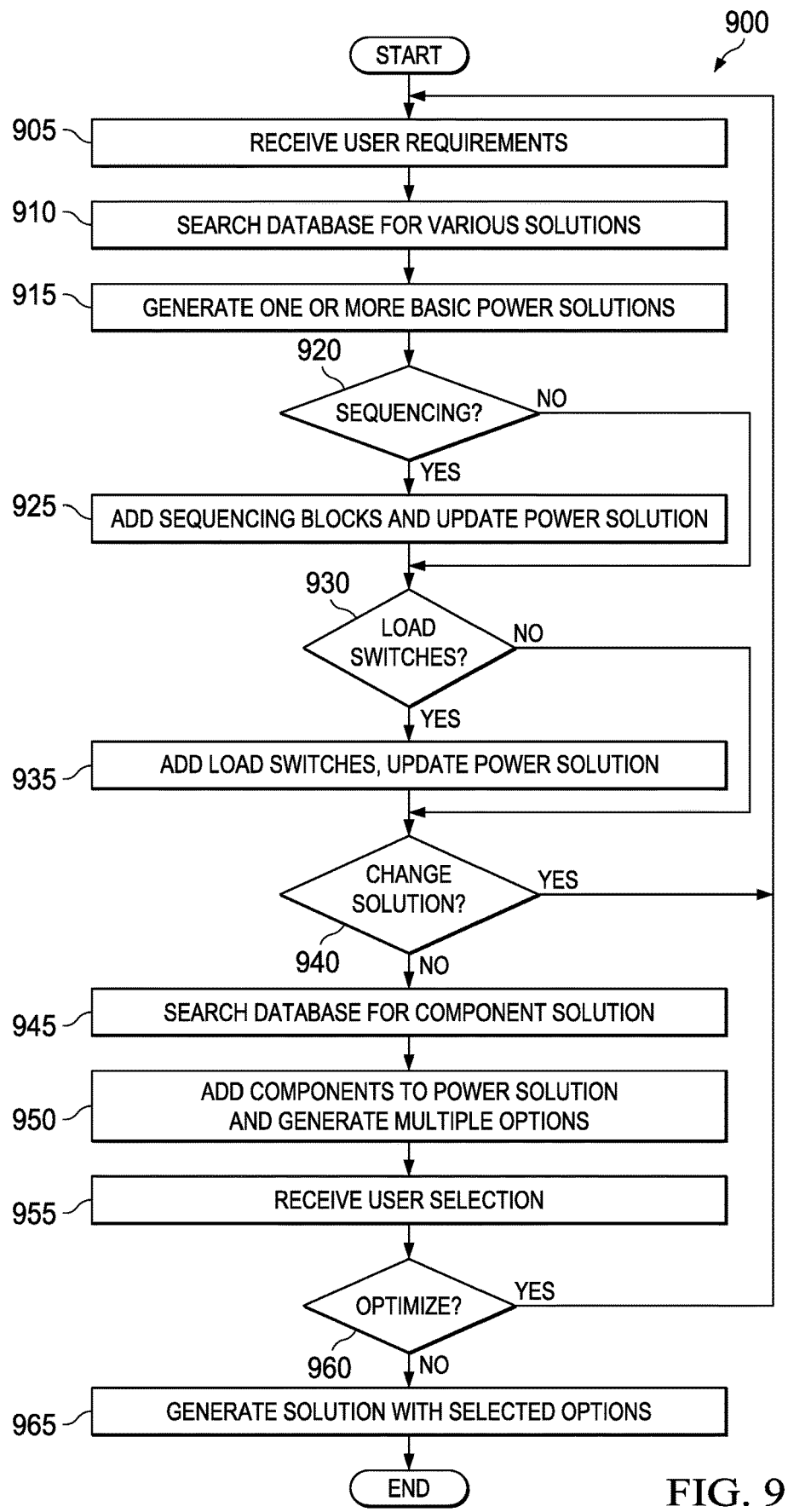
FIG. 9 illustrates an exemplary process flow diagram for generating a power solution according to an embodiment.

Referring to FIG. 9, a process flow diagram 900 for generating a power solution is illustrated according to an embodiment. Initially at 905, the power architect unit receives user requirements for power solution. The user requirements may include various parameters such as for example voltage, current, sequencing, and others as stated hereinabove. The power architect at 910 searches database (s) for various component based power solutions based on user requirements. The power architect may search an internal database or distributed databases via various communication mediums (e.g., wired, wireless, or combination thereof) as needed to provide the power solution. After locating various component based solutions, at 915 the power architect unit may generate one or more basic power tree solutions for the user such as for example as illustrated in FIG. 7C.

At 920, the power architect determines whether the user requires power sequencing. If the user requirements include power sequencing, then at 925 the power architect generates power solution using power sequencing along with appropriate flags for power up delays as required. If the user requires sequencing in the initial requirements, then this step may be made optional and the power architect may generate a power solution with sequencing without additional steps. Similarly at 930, the power architect determines if the user requirements include option for load switches and if the user requirements include load switch option, then at 935 the power architect generates power solution using load switches. If the user requires load switches in the initial requirements, then this step may also be made optional and the power architect may generate a power solution with load switches without additional steps. As illustrated, one skilled in the art will appreciate that any combination of steps in any sequence may be performed to provide an optimal power solution based on the user's requirements.

After a power solution is generated based on the user's requirement, the user may determine whether the proposed solution is optimal based on the system design requirement such as for example, footprint, number of power supplies, bill of material cost, efficiency, and other factors as explained hereinabove. If the user determines to change the proposed power solution, then the power architect receives user input at 940 and proceeds to 905 to receive updated user requirements. If the user accepts the proposed solution, then at 945, the power architect searches database for components that match user requirements and at 950, the power architect may add actual part numbers to the power solution block diagram and at 955 received user input as to the acceptance of the power solution or change in the solution based on the component list provided or at 960 determines whether the user wants to further optimize the proposed power solution. When user decides to further optimize the proposed power solution based on the actual component list, then the power architect receives user input and proceeds to 905 to receive updated user requirements otherwise the power architect proceeds to 965 to generate the final power solution with all related data reports.

Figure 10:
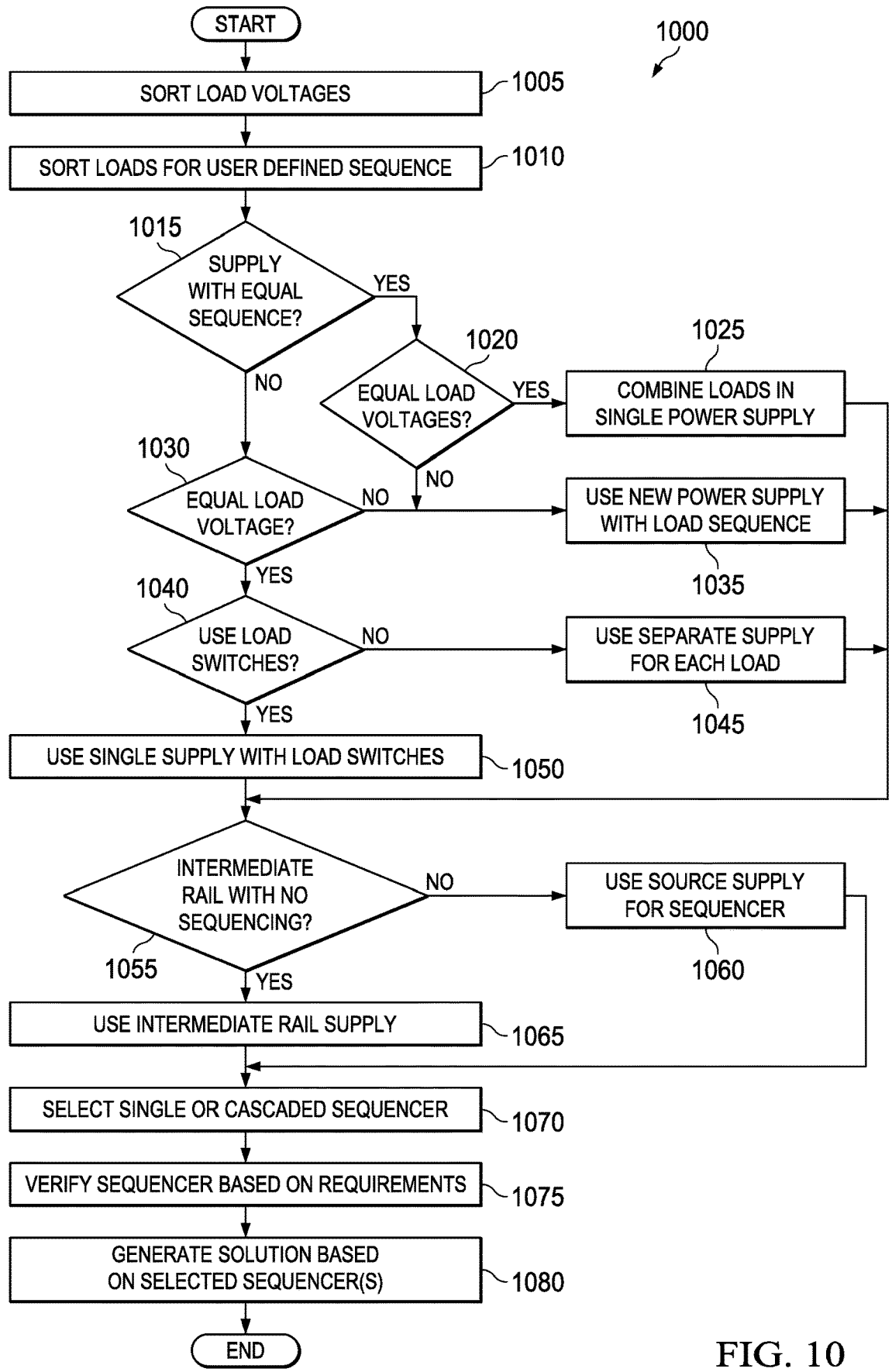
FIG. 10 illustrates an exemplary process flow diagram for generating a power solution using sequencing according to an embodiment.

Referring to FIG. 10, an exemplary process flow diagram 1000 for generating a power solution using sequencing is illustrated according to an embodiment. Initially at 1005, user requirement is sorted for load voltage of all loads that may be supported by the power solution with sequencing. In the exemplary embodiment, load voltages are sorted in descending order; however, load voltages may be sorted in any order (ascending or descending). At 1010, for each voltage value, loads are further sorted for sequencing requirement. In the exemplary embodiment, loads are sorted in the increasing order of user defined sequencing requirement; however, based on a given application, loads may be sorted in any particular order. At 1015, it is determined whether sequencing requirement for any load may be equal to other loads and in that case if a supply with equal sequencing may be used. If sequencing requirements include equal sequencing for one or more loads, then at 1020 it is determined whether these equal sequencing requirement also include equal voltage requirement for each load. If equal sequencing requirements for one or more loads also include equal voltage requirement, then at 1025 all loads with equal voltage and equal sequencing requirements are combined in a single power supply with current equal to the sum of all load currents and it proceeds to 1055.

When at 1020 it is determined that loads with equal sequencing do not have equal load voltage requirements, then at 1035, a separate power supply is used for each load with equal sequencing but different voltage requirements and it proceeds to 1055. At 1015 when it is determined that a supply with equal sequencing cannot be used for various loads, then at 1030 it is determined whether loads with unequal sequencing have equal voltage requirement. If loads with unequal sequencing do not equal voltage requirements, then at 1035, a new separate power supply with sequencing is used for each load. If loads with unequal sequencing have equal load voltage requirements, then at 1040 it is determined whether to use load switches. As stated hereinabove, various load switches may be used to sequence loads with equal voltage requirements. If load switches may not be used, then at 1045, separate power supply for each load is selected. If load switches may be used, then at 1050, one or more load switches are added to provide sequencing for loads with equal voltage requirements and it proceeds to 1055.

At 1055, it is determined whether rail power supplies may be used for the solution. If rail power supplies cannot be used then at 1060 source power supply is used for all sequencers determined in previous steps. If a rail power supply may be used, then at 1065 appropriate rail power supply is used for sequencers. In selecting appropriate rail power supply, a determination may be made to ensure that the rail power supply itself is not part of a sequencing because otherwise the downstream sequencing form the rail power supply may be dependent on the upstream sequencing. At 1070, sequencers are selected to provide sequencing determined. The sequencers may be used either individually or in a cascade form to provide appropriate sequencing for example, if number of sequencing flags required by the power solution are more than a particular given sequencer may support, then two or more sequencers of same or similar type may be cascaded to provide additional flags for sequencing. At 1075, the sequencing solution is verified based on the requirements and at 1080, a preferred solution is provided. As stated herein above, the solution provided at 1080 may either be accepted by the user or may be rejected based on various factors such as for example bill of material cost, circuit board real estate and others as described hereinabove. In case when a user may not accept the solution, then the process of generating alternate solution may be started such as the one as described with reference to FIG. 9.

In some examples, power architect 610 may selectively add load switches to a power system design based on user input indicating whether load switches are to be used for satisfying one or more sequencing requirements of a power system design. For example, user interface unit 660 may display a user interface that includes a control (see, e.g., FIG. 7B "Use Load Switch" checkbox) which receives user input indicating whether load switches are to be used for satisfying one or more sequencing requirements. In response to the user input indicating that load switches are to be used, power architect 610 may add load switches to a power system design so that the power supply design satisfies the sequencing requirements (e.g., FIG. 10; process box 1050). In response to the user input indicating that load switches are not to be used, power architect 610 may not add load switches to a power system design, but may add one or more other components (e.g., power supplies) to the power system design to satisfy the sequencing requirements (e.g., FIG. 10; process box 1045). Sequencing requirements may include one or both of start-up sequencing requirements and shutdown or (turn-off) sequencing requirements.

In further examples, power architect 610 may receive user input indicating which types of components to add to a power system design for satisfying one or more sequencing requirements, and generate the power system design based on the user input. For example, power architect 610 may receive user input indicating whether a first type of component or a second type of component is to be used in a power system design for satisfying the sequencing requirements, and add the first type of component or the second type of component to the power system design based on the user input. For example, in response to the user input indicating that the first type of component is to be used, power architect 610 may add instances of the first type of component to the power supply design (but not add instances of the second type of component to the power supply design) to satisfy the sequencing requirements. Similarly, in response to the user input indicating that the second type of component is to be used, power architect 610 may add instances of the second type of component to the power supply design (but not add instances of the first type of component to the power supply design) to satisfy the sequencing requirements. As one example, power architect 610 may receive user input indicating whether load switches or power supplies (see, e.g., FIG. 7B "Use Load Switch" checkbox) are to be used for satisfying the sequencing requirements, and generate the user input to include either additional load switches or power supplies based on the user input to satisfy the sequencing requirements.

In additional examples, the user input may indicate whether a first set of component types or a second set of component types is to be used in a power system design for satisfying the sequencing requirements, and generate the power system design based on the user input. In such examples, power architect 610 may select and use components from either the first or second set of component types depending on the user input.

In further examples, power architect 610 may generate an initial power circuit diagram, and selectively add load switches to an initial power circuit diagram based on sequencing requirements to generate a modified power circuit diagram. In additional examples, power architect 610 may receive user input specifying load termination requirements (e.g., whether the load has DDR termination requirements), and generate a power system design based on the user input to satisfy the load termination requirements.

The foregoing outline features several embodiments so that those of ordinary skill in the art may better understand various aspects of the present disclosure. Those of ordinary skill in the art should appreciate that they may readily use the present disclosure as a basis for designing or modifying other processes and structures for carrying out the same purposes and/or achieving the same advantages of various embodiments introduced herein. Those of ordinary skill in the art should also realize that such equivalent constructions do not depart from the spirit and scope of the present disclosure, and that they may make various changes, substitutions, and alterations herein without departing from the spirit and scope of the present disclosure.

Although the subject matter has been described in language specific to structural features or methodological acts, it is to be understood that the subject matter of the appended claims is not necessarily limited to the specific features or acts described above. Rather, the specific features and acts described above are disclosed as example forms of implementing at least some of the claims. Various operations of embodiments are provided herein. The order in which some or all of the operations are described should not be construed to imply that these operations are necessarily order dependent. Alternative ordering will be appreciated having the benefit of this description. Further, it will be understood that not all operations are necessarily present in each embodiment provided herein. Also, it will be understood that not all operations are necessary in some embodiments.

Moreover, "exemplary" is used herein to mean serving as an example, instance, illustration, etc., and not necessarily as advantageous. Also, although the disclosure has been shown and described with respect to one or more implementations, equivalent alterations and modifications will occur to others of ordinary skill in the art based upon a reading and understanding of this specification and the annexed drawings. The disclosure comprises all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. An apparatus comprising:
an interface; and
a server comprising a processor and a receiver, the server coupled to the user interface unit;
the receiver in the server configured to receive system characteristics from the user interface, wherein the system characteristics include a sequencing specification and a double data rate (DDR) memory load termination specification; and
the processor in the server configured to generate a circuit solution based at least in part on the received system characteristics, the circuit solution comprising components, the components including at least one power sequencer.

2. The apparatus of claim 1, wherein the circuit solution includes one or more of
power supplies; and
load switches.

3. The apparatus of claim 1, wherein the system characteristics further includes a load element voltage or a load element current.

4. The apparatus of claim 2, wherein the processor is further configured to generate at least one of a circuit footprint analysis and bill of material cost for the components.

5. The apparatus of claim 4, wherein the processor is further configured to:
receive an updated system characteristic from the interface, and generate an updated circuit solution based at least in part on the updated system characteristics.

6. The apparatus of claim 1, wherein the interface is one or more of:
a web-based interface;
a wireless interface; or
a user input device coupled to the processor and including one or more of a keyboard, a circuit design tool, or an electronic file transfer unit.

7. The apparatus of claim 1, further comprising:
a database unit coupled to the processor, wherein the database unit is coupled to the processor via one or more of:
an internal storage interface of the apparatus,
a web-based interface, or
a network interface.

8. The apparatus of claim 1, wherein the processor is configured to select the component from a plurality of components based at least in part on a rating of the plurality of components.

9. The apparatus of claim 8, wherein the rating of the plurality of components is based at least in part on the received system characteristics.

10. The apparatus of claim 2, wherein the circuit solution includes a plurality of cascaded sequencers.

11. The apparatus of claim 2, wherein the one or more power supplies are rail power supplies.

12. The apparatus of claim 2, wherein system characteristics includes one or more load elements.

13. The apparatus of claim 12, wherein
the one or more load elements have same load voltage requirements and different sequencing requirement, and
the circuit solution includes at least one load switch.

14. The apparatus of claim 12, wherein
the one or more load elements have same load voltage requirements and different sequencing requirement, and
the circuit solution includes separate power supply for each load element.

15. The apparatus of claim 12, wherein
the one or more load elements have same load voltage requirements and same power sequencing requirement, and
the circuit solution includes a single power supply for each of the load elements with same load voltage requirements and same power sequencing requirement.

16. A method comprising:
receiving, by a receiver in a server, a system characteristics from an interface, wherein the system characteristics include a sequencing specification and a double data rate (DDR) memory load termination specification, and
generating, by a processor in the server, a circuit solution based at least in part on the system characteristics, the circuit solution comprising at least one power sequencer.

17. The method of claim 16, wherein the circuit solution includes one or more of
power supplies or load switches.

18. The method of claim 16, wherein the system characteristics includes one or more of a load element voltage or a load element current.

19. The method of claim 17, further comprising generating, by the processor, at least one of a circuit footprint analysis and bill of material cost for the components.

20. The method of claim 19, further comprising:
receiving, by the processor, updated system characteristics from the user interface, and
generating, by the processor, an updated circuit solution based at least in part on the updated system characteristics.

21. The method of claim 17, wherein the interface is one or more of:
    a web-based interface;
    a wireless interface; and
    a user input device including one or more of a keyboard, a circuit design tool, and an electronic file transfer unit.

22. The method of claim 19, wherein the component is selected from a plurality of components based at least in part on a rating of the plurality of components.

23. The method of claim 22, wherein the rating of the plurality of electronic components is based at least in part on the system characteristics received from the user interface.

24. The method of claim 17, wherein the circuit solution includes a plurality of cascaded sequencers.

25. The method of claim 17, wherein the one or more supplies are rail power supplies.

26. The method of claim 17, wherein system characteristics includes one or more load elements.

27. The method of claim 26, wherein
    the one or more load elements have same load voltage requirements and different sequencing requirement, and
    the circuit solution includes at least one load switch.

28. The method of claim 26, wherein
    the one or more load elements have same load voltage requirements and different sequencing requirement, and
    the circuit solution includes separate power supply for each load element.

29. A device comprising:
    an interface; and
    a server comprising a receiver and a processor, the server coupled to the user interface;
    receive, by the receiver in the server, system characteristics from the user interface, wherein the system characteristics includes a power sequencing specification and a double data rate (DDR) memory load termination specification; and
    generate, with the processor in the server, a circuit solution based at least in part on the received system characteristics, wherein the circuit solution comprises at least one power sequencer.

30. The device of claim 29, wherein the wherein the circuit solution includes one or more of power supplies and load switches, and the processor is further configured to select components for the one or more of the power supplies and the load switches.

31. The device of claim 29, wherein the processor is further configured to
    receive an updated system characteristics from the user interface, and
    generate an updated circuit solution based at least in part on the updated system characteristics.

* * * * *